United States Patent Office 3,184,469
Patented May 18, 1965

3,184,469
PROCESS FOR PURIFYING γ-METHYL GLUTAMATE N-CARBOXY ANHYDRIDE
Yoshio Ishizuka, Yasuo Taneda, and Yasuhisa Ohno, Tokyo, Japan, assignors to Teijin Limited, Osaka, Japan, a corporation of Japan
No Drawing. Filed July 23, 1963, Ser. No. 296,923
Claims priority, application Japan, July 31, 1962, 37/32,145
3 Claims. (Cl. 260—307)

This invention relates to a process for purifying optically active γ-methyl glutamate N-carboxy anhydride (hereinafter referred to as γ-methyl glutamate NCA).

As is well known, γ-methyl glutamate NCA is an important material for preparing poly-γ-methyl glutamate useful as synthetic fibers, films or synthetic resins.

It is the well known fact that γ-methyl glutamate NCA is prepared by suspending optically active γ-methyl glutamate or a salt thereof in an appropriate medium and reacting the suspension with phosgene.

Generally, the reaction proceeds as follows.

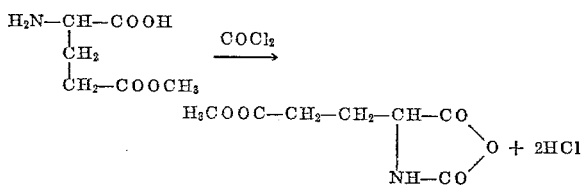

It has been considered that the use of the phosgene in at least equimolecular amount of the optically active γ-methyl glutamate is required in this reaction, and it is also known as described in British patent specification No. 646,033 that besides γ-methyl glutamate NCA the following acid chloride derivatives are produced as by-products at that time.

(wherein R stands for —CH₂—CH₂—COOCH₃).

It is also known, on the other hand, that γ-methyl glutamate NCA polymerizes while evolving carbon dioxide, producing optically active poly-γ-methyl glutamate. By adjusting the conditions of that polymerization, it is possible to make the produced optically active high molecular weight poly-γ-methyl glutamate usable as high molecular materials such as fibers and films.

However, for the production of such high molecular weight poly-γ-methyl glutamate, the existence in the γ-methyl glutamate NCA of, for instance, as described in British patent specification No. 854,139, the aforesaid acid chloride derivatives is not desirable even in a small amount.

Various improved methods for producing γ-methyl glutamate NCA hardly containing said acid chloride derivatives have been attempted, however, no satisfactory results have been obtained yet.

For instance, according to British patent specification No. 854,139, even when γ-methyl L-glutamate in the form of fine powder having a particle size of less than 5 microns is reacted with an equimolecular amount of phosgene in a medium such as dioxane so that the phosgene may not become excessive, a small amount of the acid chloride derivatives is produced. Accordingly, in order to obtain γ-methyl glutamate NCA hardly containing a chlorine-containing compound such as an acid chloride derivative, it is appropriate to recrystallize a reaction product of optically active γ-methyl glutamate and phosgene in a specific solvent.

As solvents usable for recrystallizing γ-methyl glutamate NCA, chloroform, methylene dichloride, benzene or ethyl acetate has hitherto been known. It has been well known also that a mixed solvent of chloroform or ethyl acetate with petroleum ether, n-hexane or dimethyl formamide is usable. Any one of these solvents, however, cannot be considered an advantageous solvent because, for instance, its ability of removing impurities contained in γ-methyl glutamate NCA is poor or its yield of recrystallization is not good. In addition to said defects, the use of a mixed solvent makes the recovery and other operations complicated when carried out on an industrial scale, and is not economical.

As a result of having ardently studied about its recrystallization solvents aiming at efficiently removing impurities contained in γ-methyl glutamate NCA therefrom and economically obtaining γ-methyl glutamate NCA, the present inventors have reached the process of this invention.

Namely, this invention is a process for purifying γ-methyl glutamate NCA which comprises dissolving by heating γ-methyl glutamate NCA containing impurities in 1,2-dichloroethane and crystallizing out γ-methyl glutamate NCA from the resultant solution.

The heating may be carried out at a temperature within the range of from 40° C. up to the boiling point of 1,2-dichloroethane (83.5° C.), however, heating to a temperature of 50–70° C. is preferable. Since heating to a temperature at which the solute, crude γ-methyl glutamate NCA dissolves well in 1,2-dichloroethane is required, the detailed conditions of the heating may be decided relative to the quantitative relationship between said solute and solvent.

By heating to such temperature, crude γ-methyl glutamate NCA dissolves well in 1,2-dichloroethane. Then, as the temperature is lowered below the heating temperature, purified γ-methyl glutamate NCA gradually crystallizes out, and when the solution is cooled to below 35° C., particularly to room temperature, almost all of the dissolved γ-methyl glutamate NCA crystallizes out.

For information, the solubility of γ-methyl glutamate NCA to 1,2-dichloroethane is shown as follows.

THE SOLUBILITY OF γ-METHYL GLUTAMATE NCA TO 100 ML. OF 1,2-DICHLOROETHANE

| Temp. (° C.): | Solubility (g./100 ml.) |
|---|---|
| 4 | 1.60 |
| 20 | 1.70 |
| 35 | 2.0 |
| 42 | 4.0 |
| 51.5 | 10.0 |
| 56.0 | 14.0 |
| 59 | 20.0 |
| 65 | 25.0 |

According to the process of this invention, it is possible to obtain high-purity γ-methyl glutamate NCA at high yield. Although its yield differs a little depending on the amount of impurities contained therein, it amounts to above 85%, generally at least 90%. Moreover, the amount of impurities still contained in the purified product is extremely low, as a result γ-methyl glutamate NCA containing impurities in an amount of below 0.1% by weight, generally below 0—0.02% by weight calculated as chlorine content is obtained.

The γ-methyl glutamate NCA obtained by the process of this invention can be used for the production of high molecular weight polypeptide without any further treatment.

Such feature of the process of this invention is considered to be achieved because the solubility of 1,2-dichloroethane to γ-methyl glutamate NCA and to the impurities contained therein is appropriate for the recrystallizing operations.

The aforementioned known solvents result in either a high yield of recrystallization accompanied by a poor effect of removing the impurities contained in γ-methyl glutamate NCA or, for instance, a good effect of removing the impurities accompanied by a poor yield of recrystallization. In contrast, 1,2-dichloroethane used in the process of this invention results in a good effect of removing the impurities contained in γ-methyl glutamate NCA and a high yield of recrystallization.

This fact can be known also from the results of Example 2 hereinafter described. Namely, 30 grams of crude γ-methyl glutamate NCA containing 0.84% of chlorine was recrystallized with methylene dichloride, 1,2-dichloroethane and a mixed solvent of ethyl acetate and n-hexane. In case of using methylene dichloride, γ-methyl glutamate NCA containing 0.06% of chlorine was obtained, yet the yield was only 17 grams, on the other hand, in case of using a mixed solvent of ethyl acetate and n-hexane, the yield was 27 grams, which was pretty good, but the amount of chlorine content was 0.62% and the effect of purification was poor, however, in case of using 1,2-dichloroethane according to this invention, the yield of objective γ-methyl glutamate NCA was 26 grams, which was good, moreover, an amount of the chlorine content being 0.08%, which was very little.

It may be preferable that 1,2-dichloroethane for use in the process of this invention is as pure as possible. Especially when water, alcohols and hydrochloric acid are contained in 1,2-dichloroethane, the purity of the γ-methyl glutamate NCA obtained as a result of recrystallization becomes poor, therefore, it may be preferable to avoid using 1,2-dichloroethane containing water, alcohols and hydrochloric acid.

The ratio of 1,2-dichloroethane to γ-methyl glutamate NCA differs a little depending upon the amount of impurities contained in the γ-methyl glutamate NCA, however, it may generally be 4.5–10 parts by volume (e.g., ml.), preferably 5–8 parts by volume (e.g., ml.) per part by weight (e.g., gram) of crude γ-methyl glutamate NCA.

The used 1,2-dichloroethane being able to be recovered by distillation and other operations and reused, the process of this invention is very advantageous industrially as well.

The process of this invention will be now explained by examples below, wherein amounts of the impurities contained in γ-methyl glutamate NCA are shown by amounts of chlorine contents, whose values are determined by dissolving γ-methyl glutamate NCA in a dilute nitric acid, adding thereto a certain amount of silver nitrate, precipitating silver chloride, and back titrating the excess silver nitrate, and percent in examples is based on weight except otherwise indicated.

*Example 1*

100 grams of γ-methyl L-glutamate were reacted with 123 grams of phosgene in dioxane using as a medium at 50° C. After the reaction was completed, by removing the excess phosgene and dioxane, 110 grams of crude γ-methyl L-glutamate NCA containing 0.28% of chlorine were obtained.

To 50 grams of the crude γ-methyl L-glutamate NCA were added 300 ml. of 1.2-dichloroethane, the mixture was dissolved by heating on a water bath maintained at 60° C., the dissolved mixture was crystallized by cooling, and 46 grams of substantially pure γ-methyl L-glutamate NCA were obtained, whose chlorine content was 0.01%.

For the purpose of comparison, to other 50 grams of the crude γ-methyl L-glutamate NCA was added 1 liter of chloroform, the mixture was dissolved by heating to 60° C., crystallized by cooling, and 32 grams of γ-methyl L-glutamate NCA were obtained, whose chlorine content was 0.15%.

*Example 2*

97 grams of γ-methyl D-glutamate hydrochloride were reacted with 100 grams of phosgene in ethyl acetate medium at 60° C. After the reaction was completed, by removing the excess phosgene and ethyl acetate, 91 grams of crude γ-methyl D-glutamate NCA containing 0.84% of chlorine were obtained. To 30 grams of the crude γ-methyl D-glutamate NCA were added 240 ml. of 1,2-dichloroethane and when recrystallization was carried out as in Example 1, 26 grams of γ-methyl D-glutamate NCA were obtained, whose chlorine content was 0.08%. When 25 grams of said γ-methyl D-glutamate NCA were added with 130 ml. of 1,2-dichloroethane and the similar operations were repeated, 23 grams of γ-methyl D-glutamate NCA containing 0.01% of chlorine were obtained.

For the purpose of comparison, when another 30 grams of said crude γ-methyl D-glutamate NCA were dissolved in 500 ml. of methylene dichloride and the solution was recrystallized, 17 grams of γ-methyl D-glutamate NCA were obtained, whose chlorine content was 0.06%.

For the purpose of further comparison, when still another 30 grams of said crude γ-methyl D-glutamate NCA were dissolved in 100 ml. of ethyl acetate, the solution was added with 100 ml. of n-hexane and the mixed solution was crystallized, 27 grams of γ-methyl D-glutamate NCA were obtained, which contained 0.62% of chlorine.

What is claimed is:

1. A process for purifying optically active γ-methyl glutamate N-carboxy anhydride which comprises dissolving an optically active crude γ-methyl glutamate N-carboxy anhydride in 1,2-dichloroethane by heating the system to a temperature within the range from 40° C. to the boiling point of 1,2-dichloroethane and thereafter cooling the resultant solution to a temperature below 35° C. to recrystallize the purified product.

2. The process as described in claim 1 characterized by using 4.5–10 parts by volume, of 1,2-dichloroethane per part by weight of γ-methyl glutamate N-carboxy anhydride.

3. A process for purifying optically active γ-methyl glutamate N-carboxy anhydride which comprises heating an optically active crude γ-methyl glutamate N-carboxy anhydride to a temperature of 50–70° C. in 1,2-dichloroethane in order to dissolve said anhydride, thereafter cooling the resultant solution at least to a temperature of less than 35° C. to crystallize out an optically active γ-methyl glutamate N-carboxy anhydride therefrom.

References Cited by the Examiner

UNITED STATES PATENTS 2,996,513   8/61   Ballard _____ 260—307.3

OTHER REFERENCES

Vogel, A.: Textbook of Practical Organic Chemistry (London, 1957), pages 122–127.

IRVING MARCUS, *Primary Examiner.*

JOHN D. RANDOLPH, *Examiner.*